United States Patent [19]

Leath

[11] 4,057,221
[45] Nov. 8, 1977

[54] WIRE TIGHTENING TOOL

[76] Inventor: Jimmie E. Leath, 1909 W. Wall, Midland, Tex. 79701

[21] Appl. No.: 724,303

[22] Filed: Sept. 17, 1976

[51] Int. Cl.² .............................................. B21F 27/00
[52] U.S. Cl. ................................... 256/40; 140/123.5
[58] Field of Search ....................... 256/40, 41, 37, 38; 140/123.5, 106, 108, 102.5; 254/79, 164

[56] References Cited

U.S. PATENT DOCUMENTS 2,879,808  3/1959  Mallory .............................. 740/123.5

FOREIGN PATENT DOCUMENTS 364,555  11/1922  Germany .............................. 256/40

Primary Examiner—Werner H. Schroeder
Assistant Examiner—Doris L. Troutman
Attorney, Agent, or Firm—Marcus L. Bates

[57] ABSTRACT

A tool for stretching the individual wire strands of a fence from a slack into a taut condition. The tool is left attached to the tightened wire and can subsequently be employed to further tighten or loosen the wire. The tool has a plurality of slots arranged thereon which engage spaced marginal lengths of the wire. A set of spaced tabs are used to secure the tool to the wire to prevent inadvertent unwinding. A removable handle is provided by which the tool is engaged and manipulated in a manner to fold a length of wire between the slots thereof and back upon itself, and thereafter a pair of spaced tabs engage spaced marginal lengths of the wire to prevent the tool from unwinding from the bent-up wire.

17 Claims, 12 Drawing Figures

U.S. Patent  Nov. 8, 1977  Sheet 1 of 2  4,057,221
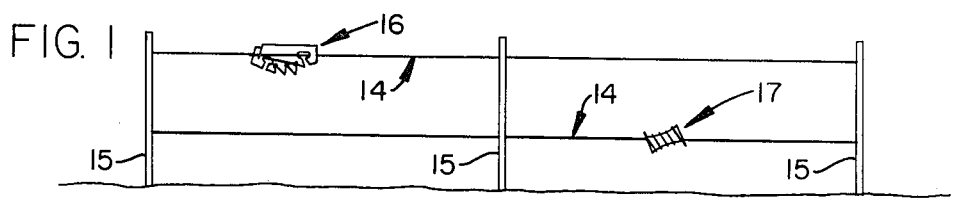
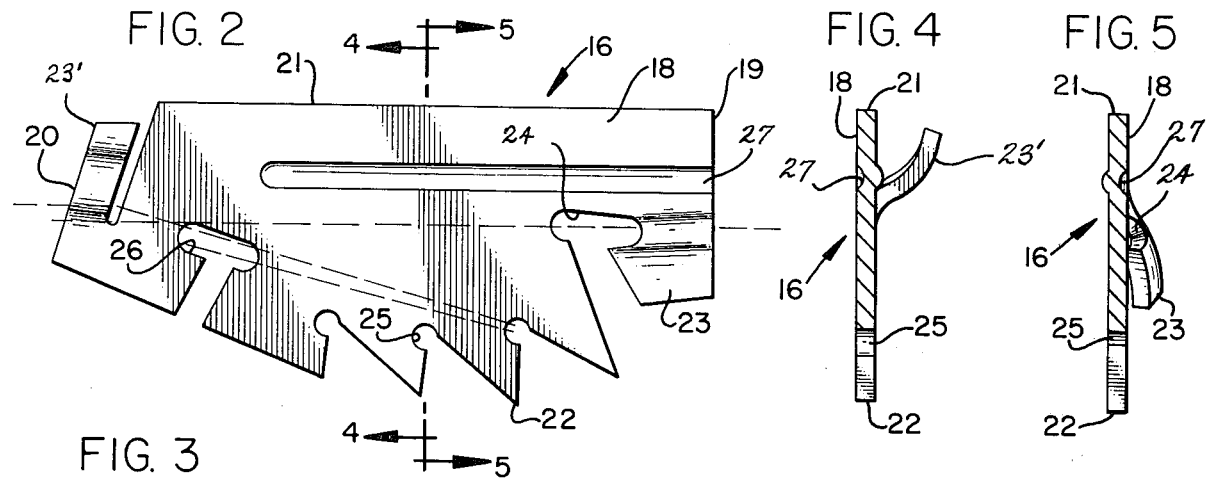
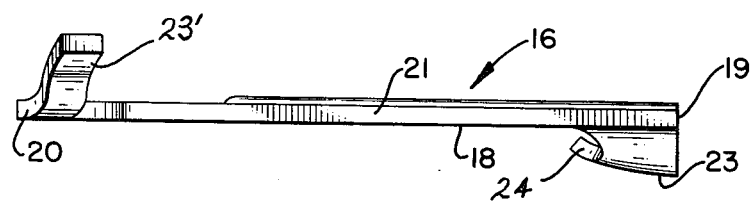
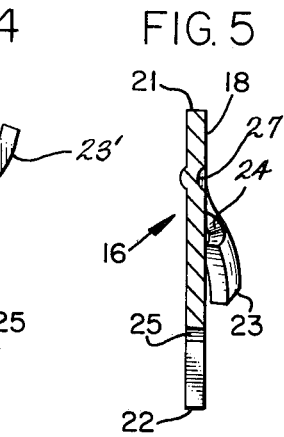
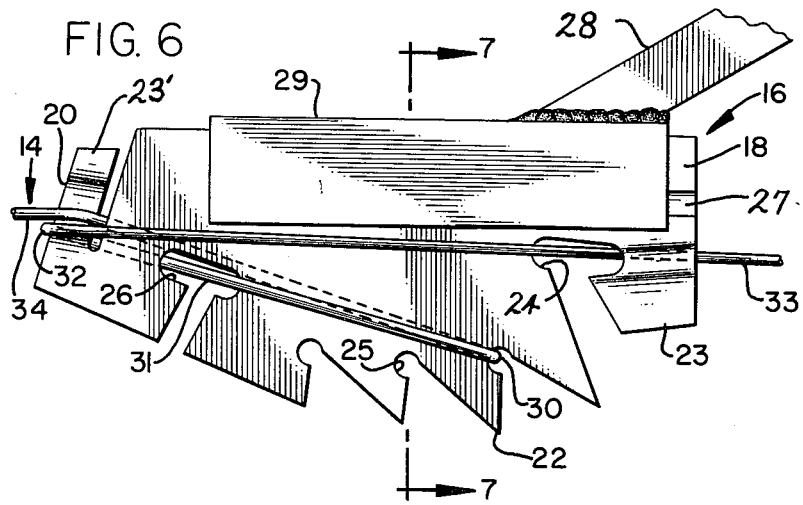
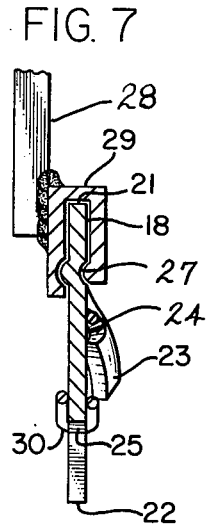
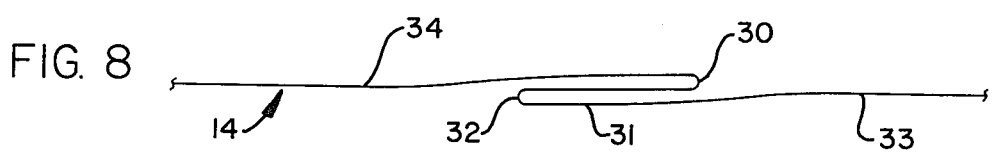

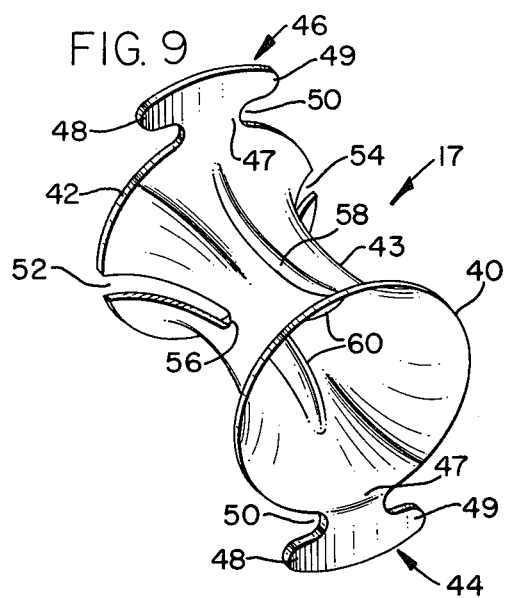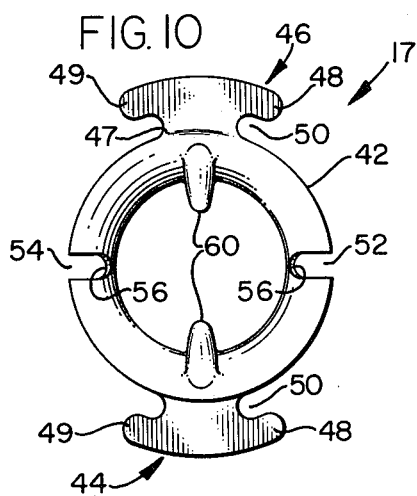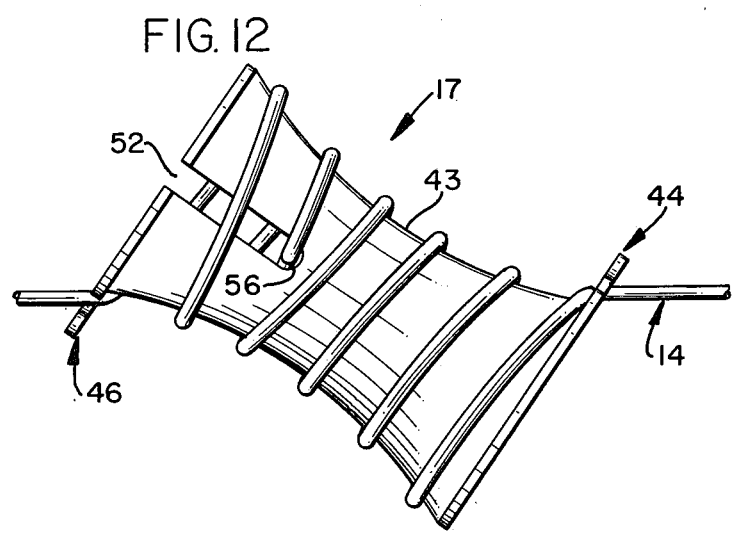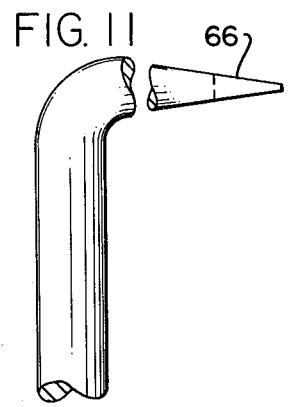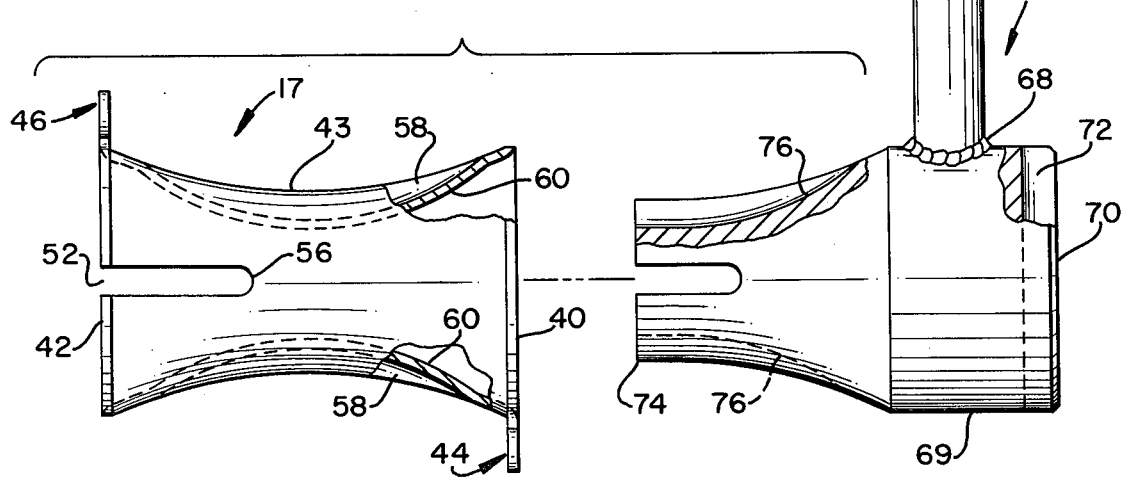

WIRE TIGHTENING TOOL

BACKGROUND OF THE INVENTION

Maintenance of a barbed wire fence constitutes one of the major expenses of a cattle rancher. Often while "riding the fence" for inspection purposes, the rancher will discover that a bull has broken through the fence and therefore the fence must immediately be repaired. This usually necessitates splicing in new lenghts of wire and thereafter, tightening the individual strands so that the entire fence is properly taut.

This is a time consuming and expensive operation because a considerable amount of effort is involved, and often the rancher will employ complex and cumbersome fence stretching equipment in order to return the individual wires of the fence to an acceptable condition.

It is therefore desirable to be able to rapidly effect repairs on the individual wire strands of a fence by splicing in a new piece of wire, and thereafter, stretching the wire tight so that it exhibits proper tautness. It is further desirable to be able to tighten a loose wire so that the wire is placed in proper tension. Moreover, it is desirable to be able to carry out these operations with a minimum of effort, time, and cost.

There are several known expedients which may be employed in stretching loose wire so that it exhibits sufficient tension for its intended purpose. For example, it is common to use a stick and twist a loop into the wire. However, this expedient sometimes overstrains the wire as it is bent back upon itself in very tight spirals, thereby causing new breaks to subsequently occur.

French Pat. No. 1,264,002 suggests a wheel device having an aperture through which the wire is placed and thereafter the wheel is rotated so that the wire is wound thereabout and thereafter the wound up wire is captured within a series of lugs. This expedient requires that one end of the wire be disconnected prior to installation of the wheel, and furthermore, the wire is severely bent back upon itself as the wheel is rotated.

German Pat. No. 364,555 suggests a plate-like member having opposed bifurcated end portions and a slotted midportion which receives a marginal length of wire therewithin so that the wire can be bent back upon itself and stretched tight. The bifurcated ends are deformed back toward one another to capture the plate respective to the wire to thereby maintain the tautness.

SUMMARY OF THE INVENTION

This invention relates to wire handling apparatus and specifically to a simple tool for stretching the individual strands of a wire fence from a slack into a taut condition. The tool includes a wire engaging member having spaced slots for initially engaging spaced marginal lengths of a slack wire. Spaced tabs are included for subsequently holding the tool respective to the spaced marginal lengths of the tightened wire.

The slots and tabs are arranged respective to one another whereby the slots engage a first spaced marginal length of the wire whereupon the tool is then rotated to wind the last marginal length of wire upon another marginal length of wire and thereafter the tabs engage the wire to prevent unwinding of the tool with respect to the wire.

One embodiment of the invention includes a flat plate member having a tab located at the leading and trailing marginal edge thereof, with there being slots spaced apart from one another and from each of the tabs. The wire is placed within selected pairs of the slots and thereafter rotated so that the wire is folded back upon itself. Opposed marginal lengths of the wire are then captured by the tabs so that the tool becomes a permanent part of the fence.

A second embodiment of the invention is in the form of a spool having opposed ends and a reduced diameter mid-portion. The spool is hollow and has a clutch means formed on the interior thereof. Outwardly directed tabs are located on opposite ends of the spool, and a pair of opposed slots extend longitudinally on one end of the tool and outwardly open away from the mid-portion thereof. A fence wire is placed within the slot and the spool is rotated to thereby wind the wire upon the mid-portion of the spool. After the fence wire has been stretched tight by winding, spaced marginal portions thereof are captured by the tabs to prevent the spool from un-winding. The spool becomes a permanent part of the fence.

In each of the above embodiments, a removable handle is employed with the tool which provides mechanical advantage in folding the wire back upon itself or winding it around the spool.

A primary object of the present invention is the provision of a tool for removing the slackness from the wires of a fence.

Another object of the invention is to provide a tool which rapidly stretches a loose wire taut.

A further object of this invention is to provide a tool which engages a continuous loose wire and is easily manipulated to stretch the wire tight.

A still further object of this invention is to provide an inexpensive tool for stretching the wire of a fence into proper tension.

Another and still further object is the provision of a low cost, fast and simple to operate tool which can be engaged with a slack wire of a fence to stretch the wire tight and thereafter leave the tool as a part of the fence.

An additional object of this invention is to provide a wire stretching tool which folds marginal lengths of a slack wire back upon itself to tighten the wire, and thereafter the tool captures marginal lengths of the wire which are spaced from the folded marginal lengths.

These and various other objects and advantages of the invention will become readily apparent to those skilled in the art upon reading the following detailed description and claims and by referring to the accompanying drawings.

The above objects are attained in accordance with the present invention by the provision of an apparatus fabricated in a manner substantially as described in the above abstract and summary.

BRIEF DESCRIPTION OF THE DRAWINGS

FIG. 1 is a part diagrammatical, part schematical illustration of a wire fence having tools made in accordance with the present invention operatively associated therewith;

FIG. 2 is an enlarged, side elevational view of a tool disclosed in FIG. 1;

FIG. 3 is a top plan view of the tool disclosed in FIG. 2;

FIGS. 4 and 5, respectively, are cross sectional views taken along lines 4—4 and 5—5, respectively, of FIG. 2;

FIG. 6 is a side elevational view which is similar to FIG. 2, and which further discloses additional apparatus in association therewith.

FIG. 7 is a cross-sectional view taken along line 7—7 of FIG. 6;

FIG. 8 is a schematical representation of part of the apparatus disclosed in FIGS. 1 and 6;

FIG. 9 is a perspective view of another embodiment of the present invention;

FIG. 10 is an end view of the apparatus disclosed in FIG. 9;

FIG. 11 is a side elevational view of the apparatus disclosed in FIGS. 9 and 10; and, FIG. 12 is a top view of a representation of the tool of FIG. 9 disclosed in its operative configuration.

DETAILED DESCRIPTION OF THE PREFERRED EMBODIMENTS

FIG. 1 discloses a wire 14, as for example a barbed fence wire, having opposed ends thereof affixed to vertical posts 15 in a conventional manner. Apparatus 16, made in accordance with the present invention, has been utilized to stretch the upper wire 14 taut. Apparatus 17, made in accordance with another embodiment of the present invention, has been employed to stretch the lower wire 14 to proper tautness.

The apparatus 16 is disclosed in detail in FIGS. 2–7. As seen illustrated in FIG. 2, in conjunction with FIGS. 3–7, the tool 16 is comprised of a flat plate member 18 having a leading end 19, a trailing end 20, an upper edge 21, and a lower edge 22. The leading end has a tab 23 formed thereon which has been bent toward the viewer thereof. A tab 23' is formed at the trailing end of the member, and is bent in a direction away from the viewer.

A plurality of slots 24, 25, and 26 are located between the tabs. The slots downwardly open in a direction opposed to edge portion 21, with the slots 25 being sloped toward the leading end 19, and the slot 26 being sloped toward the trailing end. The face of the plate member is deformed to provide a groove 27 which extends longitudinally of the tool for purposes which will be appreciated more fully later on.

As seen in FIGS. 6 and 7, a handle includes a manipulating member 28 and a tool engaging member 29. As best seen in the illustration of FIG. 7, the tool engaging end 29 is of an inverted U-shaped configuration which cooperates with the groove 27 such that a tongue and groove co-acting relationship is established. The U-shaped tool engaging member 29 slidably receives the upper marginal edge of the plate member 18 therein so as to slidably capture the plate member in a removable manner.

As seen in FIG. 6, together with FIG. 8, the wire 14 includes spaced marginal lengths 30 and 31 which are engaged by two of the spaced slots of the tool. After the tool is attached to the wire it is rotated 180°, thereby folding the wire upon itself. As best seen in FIG. 8, the length of wire 30 and 32 is folded upon itself by rotating the tool the aforesaid 180°. The wire thereby extends from 33, which is positioned adjacent to tab 23, through slot 24, about the trailing end portion 20, where the wire reverses itself at 32 and continues along the opposed side of the tool in an opposite direction where it is received through slot 26. The wire continues at 31 where it again reverses its direction at 30 by making a 180° bend within one of the slots, specifically, slot 30. The wire continues back up under the tab 23' which secures the tool against rotation. The tool is permanently left attached to the wire and can be employed at a subsequent date for secondary tightening of the wire.

In operation of the first embodiment of the invention the tool 16 is slidably positioned in properly assembled relationship respective to the tool engaging member 29. The tool is placed laterally of the wire 14 with a marginal length thereof positioned within the slot at 26. The tool is next manipulated by the handle to cause it to rotate 90° or parallel to the wire, whereupon the appropriate slot is selected to receive a marginal end of the wire therewithin. The specific slot 25 used for engagement of the wire determines the tension imparted into the loose wire.

The tool is next rotated 180° to fold one length of wire back upon itself in the illustrated manner of FIGS. 6 and 8, whereupon the tool is then tilted to cause the leading end to move downward and the trailing end upward, so that spaced marginal ends of the wire is received under tabs 23 and 24. The tool and fence wire is now in the configuration of FIG. 6, where the tightened wire is held secured to the tool, and the tool becomes a part of the fence until some subsequent time when intervening circumstances cause the fence to be further repaired.

In the second embodiment of the invention disclosed in FIGS. 9–12, the apparatus 17 is seen to be in the form of a hollow cylindrical spool having opposed flanges in the form of round ends 40 and 42, between which there is formed a cylindrical mid-portion 43. Opposed tabs 44 and 46 are attached to the round end, at 47 for example, and include the illustrated curved ears 48 and 49. The ears leave the illustrated opposed cutouts 50 for capturing a wire therewithin. Tab 44 is preferably placed 180° apart from tab 46, while the tabs are spaced apart from one another by the entire spool.

One marginal end of the spool is provided with opposed slots 52 and 54. The slots commence at 56 in proximity of the joinder area of the mid-portion and the flange, and outwardly open through the round end 42. Hence, the opposed slots 52 and 54 are more or less longitudinally disposed respective to the axial centerline of the spool, and outwardly open away from an opposed end 40 thereof.

The spool is reinforced by inwardly deforming a plurality of radially spaced apart, longitudinally extending, circumferentially disposed grooves 58 which additionally form a clutch means 60 within the interior of the spool.

A handle 62 is used in combination with the spool 17, and includes a handle 64 thereon which is turned 90° to 66, with the end portion thereof being reduced in diameter into a sharpened point suitable for pulling staples. The handle is affixed at 68 to a spool engaging member 69. The spool engaging member has an end portion 70 made into the form of a flat face suitable for driving staples. A U-shaped slot 72 is formed in flat face 70 for engaging the slot 27 of the first embodiment of the invention.

End 74 of the spool engaging member 69 is splined at 76 for receiving the grooves 58 of the clutch members 60 therewithin. The splines are made by deforming the marginal end of the tool so that it is slidably received in proper registry within the spool in working engagement with the grooves.

In operation, the apparatus disclosed in FIG. 11 is properly mated to one another by inserting end 74 of member 69 into the interior of the spool 17 so that the co-acting radially spaced splines 58 and 76 engage one another in a manner to form the before-recited clutch means. This enables mechanical advantage to be achieved by applying a force on handle 64, thereby rotating the spool about its longitudinally axis with tremendous mechanical advantage.

Opposed marginal lengths of a wire are received within slots 52 and 54, and the handle 64 is then employed to rotate the spool respective to spaced marginal ends of the wire, thereby winding the wire upon the mid-portion 43 of the spool.

As the tool tightens the slack wire to the proper tautness, the tool is manipulated by the handle to turn tabs 44 and 46 toward spaced marginal lengths of the wire 14, whereupon the handle is then gently relaxed to allow the spool to move toward whatever normal relaxed direction it desires, whereupon the opposed marginal lengths of the wire 14 contact the opposed rims 40 and 42, and the tool moves in a direction whereby the wire is captured by the cutouts 50 of the opposed tabs. This expedient places the tool into the configuration illustrated in FIGS. 1 and 12.

In the embodiment of FIGS. 9-11, any number of coacting splines and grooves 58 and 76 may be employed and arranged in a manner to enable the handle 64 to be applied in indexed relation respective to the apparatus 17. For example, it is advantageous to provide one specific embodiment having a single groove 58 and a single spline 76 arranged respective to one another such that when the coacting apparatus is mated, the tab 46 extends radially in the same direction as the handle, as illustrated in FIG. 11. These expedients prevent the operator from inadvertently placing the spool device on the tool handle in the incorrect position. The spaced parallel edges forming the sides of slots 52 and 54 may be bent inwardly to increase the bearing pressure at the area where the wire contacts the edge of the slot. This expedient reduces the radius of bend of the wire at 56, for example.

Where deemed desirable, the U-slot can be eliminated from the flat end 70 of the handle member 69. Moreover, it is contemplated to weld a tool engaging member, such as seen at 29 in FIGS. 6 and 7, onto the cyindrical side of member 69 so that the flat hammering end 70 is free of the illustrated U-slot.

The tool of the present invention can be advantageously employed during emergencies for tightening electrical and telephone lines. Moreover, the tool of the present invention can be used to overcome the expansion and contraction problems caused by extreme ambient seasonal temperature changes, such as may be found in cold northern states such as North Dakota, for example. This is achieved by loosening the tool in the winter and tightening the tool in the summer seasons.

I claim:

1. A tool for stretching the individual strands of a barbed wire fence from a slack into a taut condition comprising:

a wire engaging member which is cylindrical in form and includes a reduced diameter midportion, and opposed ends; said member having means forming spaced first and second slots therewithin for initially engaging spaced marginal lengths of the slack wire, said slots extend from one said end towards said midportion and opens in an outward direction;

spaced first and second tabs for subsequently holding the tool respective to other spaced marginal lengths of the tightened wire;

said slots and said first of said tabs are arranged on one end of said member and in spaced relationship respective to one another; the second of said tabs being arranged on the end of the member which is opposed to the first of said tabs; to thereby enable said slots to engage the first recited spaced marginal lengths of the wire, and said tool can then be rotated to wind another marginal length of wire upon the tool, and thereafter said tabs can engage the wire to prevent unwinding of the tool respective to the wire.

2. The tool of claim 1 and further including a handle, a clutch means formed on said tool and said handle by which said handle can releasably engage said tool.

3. A tool for stretching the individual strands of a barbed wire fence from a slack into a taut condition comprising:

a wire engaging member in the form of a flat piece of material having a top, bottom, leading edge, and trailing edge; means, including a cutout, forming spaced first and second slots within said member for initially engaging spaced marginal lengths of the slack wire;

means, including a cutout, forming spaced first and second tabs within said member for subsequently holding the tool respective to other spaced marginal lengths of the tightened wire;

said first tab being formed at said leading edge and is a downwardly directed tab; said second tab being formed at said trailing edge and is an upwardly directed tab;

said slots being downwardly and forwardly disposed and located intermediate said first and second tabs in spaced relationship to one another, with each said slot being spaced at a different distance from one of said tabs;

means by which said slots and said tabs are arranged in spaced relationship respective to one another to enable said slots to engage the first recited spaced marginal lengths of wire and said tool thereafter rotated to wind a marginal length of wire upon said tool and thereafter said tabs engage said other spaced marginal lengths of the wire to prevent unwinding of the tool respective to the wire.

4. The tool of claim 3 wherein another spaced slot is included therein to thereby enable the wire to engage said first slot and selectively engage either of said second spaced slot and said another slot, to thereby enable the degree of tautness to be selected by selecting the spaced distance between said first and the remaining slot for engagement of the wire.

5. A tool for stretching the individual strands of a barbed wire fence from a slack into a taut condition comprising:

a wire engaging member having opposed ends, means forming a slot in one of said opposed ends for initially engaging spaced marginal lengths of the slack wire; said slots being disposed in opposed relationship and formed in opposed sidewalls of said member;

spaced tabs for subsequently holding the tool respective to other spaced marginal lengths of the tightened wire; said tabs being laterally arranged in spaced relationship to one another and to the axial centerline of said member;

said slots and one of said tabs are arranged on one of said opposed ends in spaced relationship respective to one another and in opposition to the other of said tabs to enable said slots to engage the first recited spaced marginal lengths of the wire and said tool rotated to wind another said marginal length of wire thereupon and thereafter, said tabs engage said other spaced marginal lengths of the tightened wire to prevent unwinding of the tool respective to the wire.

6. The tool of claim 5 wherein said member is cylindrical in form and includes a reduced diameter midportion; and opposed round ends;

said slots extend from one said end towards said midportion and opens in an outward direction;

said slots and one said tab being located on one end with the remaining tab being located on the remaining end.

7. The tool of claim 1 wherein said midportion has a clutch formed therewithin;

a handle having a shank which is removably received within said midportion, means on said shank for engaging said clutch to thereby enable said handle to impart rotational motion into said tool.

8. The tool of claim 7 wherein the terminal end of said handle includes means forming a sharpened end thereon for pulling staples, and further including means forming a hammer on said shank in opposition to said means for engaging said clutch for driving staples.

9. A wire stretching tool for engaging and tightening a loose wire having the opposed ends thereof affixed to spaced posts, said tool having a cylindrical body; said body having means forming two spaced, wire engaging tabs and a wire engaging slot thereon, said slot and said tabs being spaced from one another;

said body having opposed terminal ends, said slot being longitudinally disposed and formed through the opposed sidewalls of a marginal end of said body; said tabs being laterally arranged in spaced relationship to one another and to the axial centerline of said hollow member; such that a wire can be received transversely of said body and within said slot, said member can be rotated axially to tighten the wire as the wire is wound about said body, and the wire can thereafter be engaged by said tabs.

10. The tool of claim 9 and further including a handle for releasably engaging said tool, said handle including a tool engaging member and a manipulating member spaced therefrom;

a clutch formed on said tool by which said handle is removably engaged therewith.

11. The tool of claim 3 wherein another spaced slot is included therein to thereby enable the wire to engage said first slot and selectively engage only one of said second slot and said another slot, to thereby enable the degree of tautness imparted into the wire to be selected by selecting the spaced distance between said first and the remaining slot for engagement of the wire.

12. The tool of claim 11 wherein said body includes a reduced diameter midportion;

said slot extends through a marginal length of said midportion, through one said end, and opens in an outward direction;

said slots and one said tab being located on one end with the other tab being located on the other end.

13. The tool of claim 3 wherein said midportion has a clutch formed therewithin;

a handle having a shank which is removably received within said midportion, means on said shank for engaging said clutch to thereby enable said handle to impart rotational motion into said tool.

14. The tool of claim 13 wherein the terminal end of said handle includes means forming a sharpened end thereon for pulling staples, and further including means forming a hammer on the end of said shank in opposition to said means for engaging said clutch so that the hammer can be used for driving staples.

15. A wire stretching tool for engaging and tightening a loose wire affixed to spaced posts;

said tool is a flat piece of material having opposed faces and defined by a top, bottom, leading edge, and trailing edge; means forming a plurality of cutouts therein for the formation of a plurality of slots and tabs;

one of said tabs being formed by one of said cutouts at said leading edge which results in a downwardly directed tab; another of said tabs being formed by one of said cutouts at said trailing edge which results in an upwardly directed tab;

said slots being downwardly and forwardly disposed and located intermediate said tabs and in spaced relationship respective to one another; with each said slot being spaced a different distance from one said tab;

said slots being arranged to engage spaced, marginal lengths of said wire such that the wire located between said slots can be rotated back upon itself, and thereafter said tabs can engage other spaced, marginal lengths of the wire wherein the first spaced, marginal lengths of wire lie within said other spaced, marginal lengths of said wire; and, said tabs engage the wire and arrest said tool from rotating respective to the wire, thereby capturing the wire about the tool.

16. The tool of claim 15 wherein another spaced slot is included therein to thereby enable the wire to engage said first slot and selectively engage only one of said second slot and said another slot, to thereby enable the degree of tautness imparted into the wire to be selected by selecting the spaced distance between said first and the remaining slot for engagement of the wire.

17. The tool of claim 15 and further including a handle for releasably engaging said tool, said handle including a tool engaging member and a manipulating member spaced therefrom;

a clutch formed on said tool by which said handle is removably engaged therewith.

* * * * *

UNITED STATES PATENT OFFICE
CERTIFICATE OF CORRECTION

PATENT NO. : 4,057,221
DATED : November 8, 1977
INVENTOR(S) : JIMMIE E. LEATH

It is certified that error appears in the above-identified patent and that said Letters Patent are hereby corrected as shown below:

Column 4, line 48, "to" should read --at--.

Column 6, line 45, delete "spaced" before "slot" and insert --spaced-- after "another".

Column 8, line 6, "The tool of Claim 3" should read --The tool of Claim 12-- .

Signed and Sealed this

Fourth Day of April 1978

[SEAL]

Attest:

RUTH C. MASON
Attesting Officer

LUTRELLE F. PARKER
Acting Commissioner of Patents and Trademarks